FIG. I.

INVENTORS.
HAYES L. PAGEL
ORLAN GUNDERSON
BY
*Hazard & Miller*
ATTORNEYS.

Oct. 1, 1963 H. L. PAGEL ETAL 3,105,339
PNEUMATIC COMBINE
Filed May 17, 1960 2 Sheets-Sheet 2

INVENTORS.
HAYES L. PAGEL
ORLAN GUNDERSON
BY
*Hazard & Miller*
ATTORNEYS.

United States Patent Office 3,105,339
Patented Oct. 1, 1963

3,105,339
PNEUMATIC COMBINE
Hayes L. Pagel, 1429 Highland Ave., Glendale, Calif., and Orlan Gunderson, Kent, Minn.
Filed May 17, 1960, Ser. No. 29,768
11 Claims. (Cl. 56—19)

This invention relates to an apparatus for harvesting and threshing grains.

An object of the invention is to provide a device which will pick up grain which has been mowed and raked into windrows and which will thresh the grain discharging the chaff from one outlet and the threshed grain from another outlet.

More specifically, an object of the invention is to provide an apparatus of very simple construction having relatively few moving parts which will easily and quickly thresh the grain and separate the grain from the chaff.

Still another object of the invention is to provide an apparatus having the above-mentioned characteristics which is adjustable to accommodate itself to characteristics of different grains so that grains of different characteristics can be threshed thereby.

With the foregoing and other objects in view, which will be made manifest in the following detailed description and specifically pointed out in the appended claims, reference is had to the accompanying drawings for an illustrative embodiment of the invention, wherein:

Figure 1:
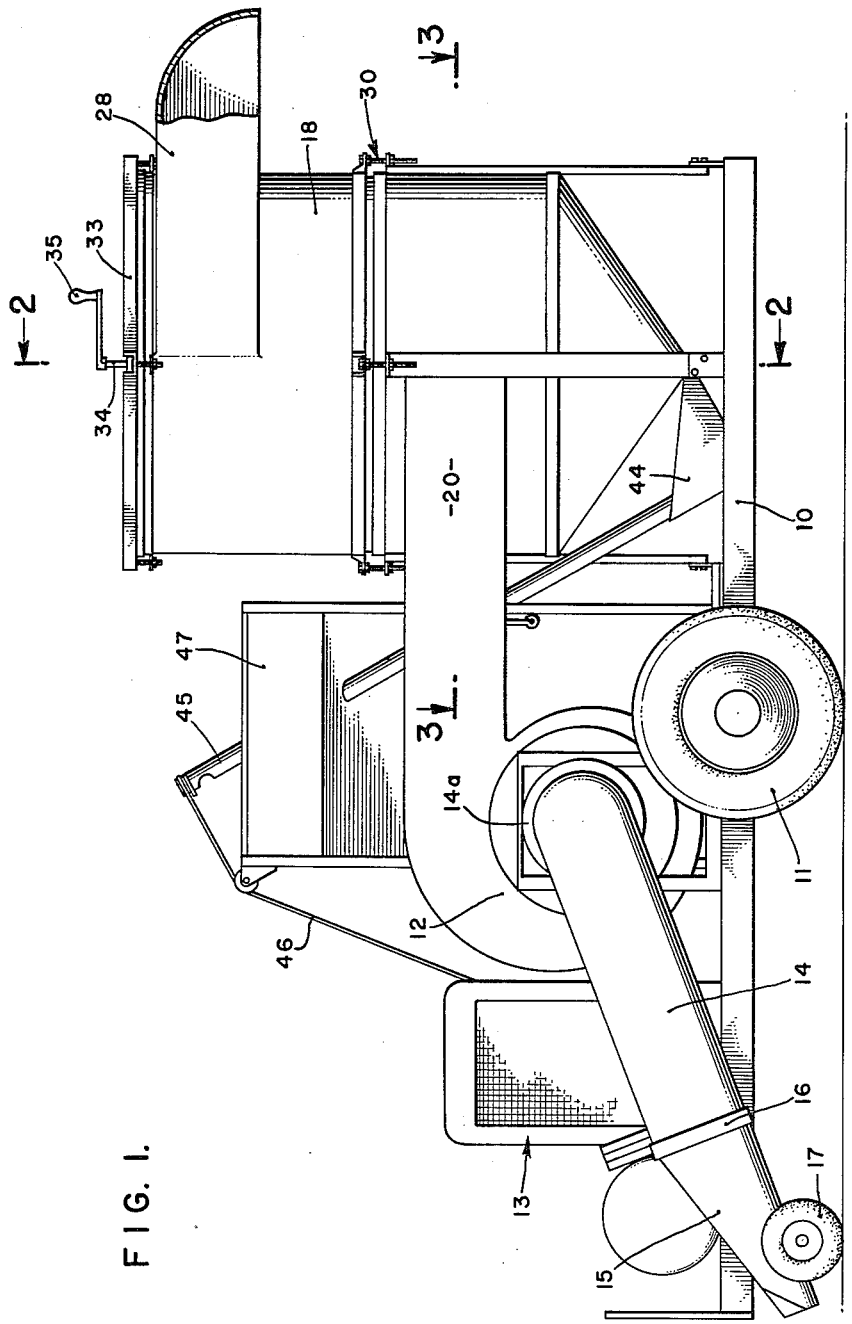
FIGURE 1 is a view in side elevation of apparatus embodying the present invention.
Figure 2:
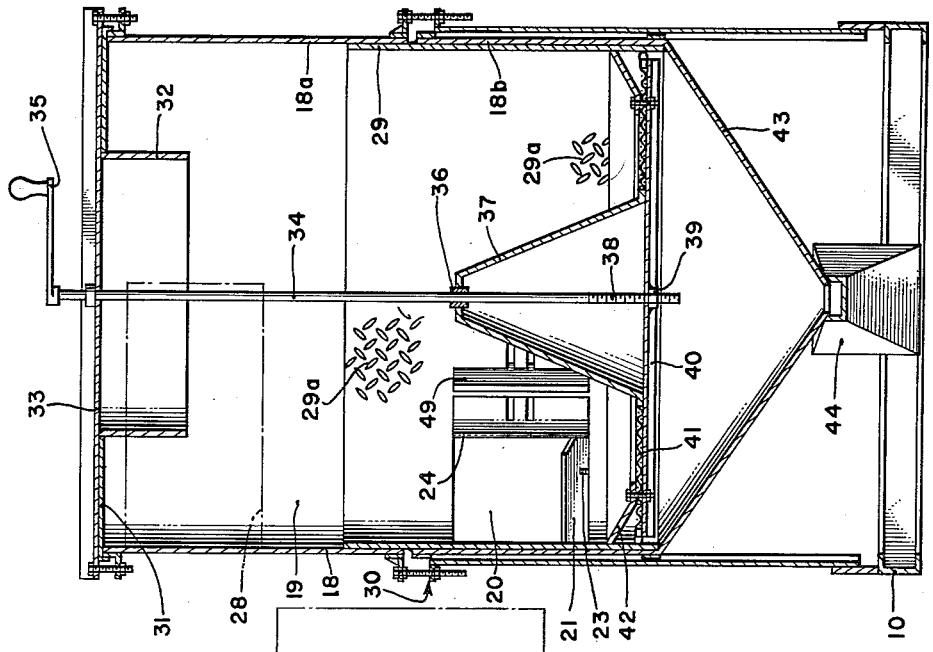
FIG. 2 is a vertical section taken substantially upon the line 2—2 upon FIG. 1 in the direction indicated.
Figure 3:
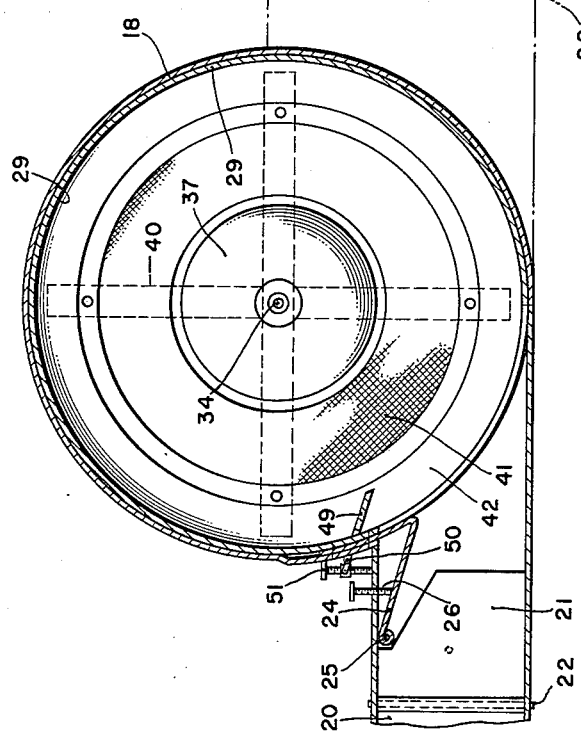
FIG. 3 is a horizontal section taken substantially upon the line 3—3 upon FIG. 1 in the direction indicated.

Referring to the accompanying drawings wherein similar reference characters designate similar parts throughout, the apparatus embodying the present invention is preferably mounted on a vehicle such as a trailer, having a suitable frame 10 and ground wheels 11. On this vehicle which is adapted to be towed over the ground by a tractor or the like, there is mounted a power-driven blower 12 driven by any suitable source of power, such as by an internal combustion engine generally indicated at 13.

The blower 12 has a central inlet on which an angular tube 14 is mounted for swinging movement such as by a swivel joint 14a about a horizontatl axis coincident with the central axis of the blower. The tube 14, in turn, may be equipped with a flattened and consequently widened nozzle 15 adjacent its lower end which is rotatable relative to the tube 14 by means of a swivel joint at 16. This nozzle may, in turn, be supported on one or more ground wheels 17 so that its entrance will be maintained parallel to and slightly above the surface of the ground.

Adjacent the rear of the vehicle there is a generally cylindrical tank 18 which provides in its interior a threshing chamber 19. The outlet 20 from the blower 12 is arranged to discharge into the threshing chamber 19 in a generally tangential direction adjacent the bottom thereof. Near the point of discharge of the outlet 20 into the threshing chamber 19 the outlet from the blower is equipped with a vertically adjustable baffle 21 pivotally mounted as at 22 and adjusted by an adjusting screw 23. Similarly, the inner wall of the outlet 20 adjacent its point of discharge into the threshing chamber is equipped with a baffle 24 pivoted as at 25 and adjusted such as by an adjusting screw 26.

The outlet 28 for chaff and air is also arranged in a generally tangential manner adjacent the top of the threshing chamber 19 and a considerable distance above the inlet to the chamber provided by the outlet 20 from the blower 12.

Within the threshing chamber around the lower portion thereof there is a cylindrical liner 29 that presents a roughened internal surface. This liner is preferably formed of diamond plate or the equivalent which has more or less diamond-shaped embossments 29a on its interior surface not all of which have been illustrated. The particular configuration of the embossments is relatively unimportant but it is important that the liner present a roughened or irregular interior surface. Such a surface might be formed by arranging a plurality of small vertical rods in closely adjacent relation against the interior surface of the liner.

The tank 18 is preferably formed of two separable sections 18a and 18b detachably connected together as at 30 enabling the tank to be readily opened for removal and replacement of the liner 29 whenever the liner becomes too smooth to function properly in threshing the grain.

The top of the tank indicated at 31 may have a central opening therein around which is arranged a downwardly extending apron 32 and across which extends arms of a spider 33. This spider provides a central bearing for a vertical shaft 34 that can be rotated by a crank 35 above the top 31 of the tank. The lower end of this shaft extends through a bearing 36 at the top of a cone 37 and its extreme bottom is threaded as at 38 and extends through a nut 39 on a spider 40, the arms of which support a screen 41, the interstices of which provide passages for the passage of threshed grain downwardly therethrough. The edges of the screen are equipped with an inclined imperforate metal plate 42 which fits closely against the interior of the liner 29. Its inclination serves to prevent grain from piling up in the corner between the screen and the liner. This plate tends to cause the grain to descend by gravity toward that portion of the screen which is inwardly of its edges. The plate 42 forms in effect an inwardly extending imperforate ledge adjacent the cylindrical walls and below the inlet that causes the incoming air and grain entering through the inlet to swirl upwardly in a helical manner adjacent the walls and not in a downward direction. By rotating the crank 35 the location of the bottom of the threshing chamber 19 formed by the screen 41 can be vertically adjusted. The bottom of the tank 18 is conically shaped as indicated at 43 and serves as a hopper or collector for the threshed grain that passes through the screen 41 and directs it to the bottom 44 of a screw elevator or conveyor 45 that can be driven such as by a belt or the equivalent 46 off of the internal combustion engine 13. This elevator or conveyor merely lifts the threshed grain collected by the collector 43 from the lower elevation to a higher elevation where it can be discharged into a hopper 47. On opening the hopper 47 the threshed grain can be released into a truck or similar conveyance that may be driven alongside.

Adjacent the baffles 24 there is an inwardly extending baffle 49 which may be pivoted as at 50 and adjusted by an adjusting screw 51. This baffle extends inwardly from the liner 29 adjacent the inlet to the threshing chamber 19 and serves to direct solids carried by the airstream across the inlet and to cause them to impinge against the liner on the opposite side of the inlet with considerable force.

The operation and advantages of the above-described construction are substantially as follows:

The grain that is to be harvested and threshed may be assumed to have been mowed and to have been raked into windrows. The vehicle herein disclosed may be then towed so that the nozzle 15 will pass directly over the top of the windrow in a direction longitudinally thereof. The operation of the blower 12 causes air to flow at high velocity through the nozzle 15 and pipe 14 toward the center of the blower carrying with it the cut grain. This cut grain and straw passes through the blower 12 and is discharged therefrom through its outlet 20 which constitutes the inlet to the threshing chamber 19. The grain and straw being discharged in a tangential direction in the threshing chamber 19 adjacent the bottom thereof sweep with the incoming air around the interior of the cylindrical roughened liner 29. The air introduced into the threshing chamber 19 through the inlet tends to quickly rise helically within the threshing chamber and to be discharged through the outlet 28. It will carry with it the chaff and straw which are of relatively low specific gravity and which have been released from the threshed grain. The unthreshed grain however being of greater specific gravity, tends to remain near the bottom of the threshing chamber and may be carried around the interior of the liner by the incoming air more than one complete revolution. In the course of its movement around the interior surface of the roughened liner 29 it encounters the embossments thereon and considerable amount of the grain is threshed thereby. However, on completing the initial circuit around the interior of the liner unthreshed grain then encounters the baffle 49 and after being directed inwardly away from the liner 29 and across the incoming airstream from the outlet 20 of the blower, this unthreshed grain again strikes the liner on the opposite side of the inlet to the threshing chamber. Such grain consequently re-encounters the liner 29 with considerable impact, thus completing the threshing of any grain kernels that may be difficult to thresh. The grain may be carried around the interior of the liner 29 several times before it is completely threshed but on completion the chaff and straw are carried upwardly by the ascending helical current of air and are discharged through the outlet 28. The threshed grain falls onto the screen 41 and passes through the interstices thereof to be collected by the collector 43 and conveyed to the hopper 47 by the elevator or conveyor 45.

Different grains, of course, have different characteristics with respect to the specific gravity of the grain kernels themselves as well as with respect to the chaff and straw. For this reason, the bottom of the threshing chamber formed by the screen 41 is made vertically adjustable with relation to the inlet by rotating the crank 35. Also, by adjusting the bottom baffle 21 and the side baffle 24 the incoming air stream and grain can be properly directed with relation to the walls of the liner 29 so as to accomplish a proper threshing of it. Usually, the air in the center of the threshing chamber 19 around the shaft 34 outwardly to a point approximately vertically beneath the apron 32 is in a more or less quiescent condition and the cone 37 is consequently employed over the center of the screen so as to direct any descending grain outwardly near the edges of the screen 41. This is to avoid piling up of grain near the center of the bottom of the threshing chamber occasioned by the quiescent conditions in this locality. Grain falling on the screen 41 is usually moved to some extent by the circulating air despite its greater density until it falls through the interstices in the screen.

It will be appreciated from the above-described construction that the device is very simple in its design and operation having relatively few moving parts. Nevertheless it is highly efficient in its operation of picking up mowed and windrowed grain, threshing the grain and discharging the chaff and straw through one outlet and the separated grain through another outlet.

While the invention has been described as having been built on a trailer subject to being towed by a tractor or the like, it will be readily appreciated that it may be carried by a self-propelled vehicle.

Various changes may be made in the details of construction without departing from the spirit and scope of the invention as defined by the appended claims.

We claim:

1. An apparatus for threshing grains comprising means providing a generally cylindrical chamber having a generally tangential inlet for an air blast and grain to be threshed adjacent its bottom, there being a generally tangential outlet for air and chaff adjacent its top, the cylindrical walls of the chamber presenting roughened surfaces, the bottom of the chamber having passages therethrough for the passage of threshed grain.

2. An apparatus for threshing grains comprising means providing a generally cylindrical chamber having a generally tangential inlet for an air blast and grain to be threshed adjacent its bottom, there being a generally tangential outlet for air and chaff adjacent its top, the cylindrical walls of the chamber presenting roughened surfaces, the bottom of the chamber having passages therethrough for the passage of threshed grain, and a collector beneath the bottom for collecting the grain that passes through the bottom.

3. An apparatus for threshing grains comprising means providing a generally cylindrical chamber having a generally tangential inlet for an air blast and grain to be threshed adjacent its bottom, there being a generally tangential outlet for air and chaff adjacent its top, the cylindrical walls of the chamber presenting roughened surfaces, the bottom of the chamber having passages therethrough for the passage of threshed grain, and means for vertically adjusting the bottom.

4. An apparatus for threshing grains comprising means providing a generally cylindrical chamber having a generally tangential inlet for an air blast and grain to be threshed adjacent its bottom, there being a generally tangential outlet for air and chaff adjacent its top, the cylindrical walls of the chamber presenting roughened surfaces, the bottom of the chamber having passages therethrough for the passage of threshed grain, said inlet having an adjustable baffle adjacent the inner side thereof.

5. An apparatus for threshing grains comprising means providing a generally cylindrical chamber having a generally tangential inlet for an air blast and grain to be threshed adjacent its bottom, there being a generally tangential outlet for air and chaff adjacent its top, the cylindrical walls of the chamber presenting roughened surfaces, the bottom of the chamber having passages therethrough for the passage of threshed grain, said inlet having an adjustable baffle adjacent the bottom thereof.

6. An apparatus for threshing grains comprising means providing a generally cylindrical chamber having a generally tangential inlet for an air blast and grain to be threshed adjacent its bottom, there being a generally tangential outlet for air and chaff adjacent its top, the cylindrical walls of the chamber presenting roughened surfaces, the bottom of the chamber having passages therethrough for the passage of threshed grain, said inlet having adjustable baffles adjacent the bottom and a side thereof.

7. A device of the class described comprising a movable vehicle having a power-driven blower mounted thereon, the inlet to which is provided with a nozzle movable adjacent the ground as the vehicle is moved so as to pass over mowed and windrowed grain to cause the grain to be drawn into the blower with the incoming air, means providing a generally cylindrical chamber into which the outlet from the blower discharges in a generally tangential manner adjacent the bottom thereof, there being a generally tangential outlet from the chamber adjacent the top thereof, the cylindrical walls of the chamber presenting roughened surfaces, and the bottom of the chamber having passages therethrough for the passage of threshed grain, and means for collecting the threshed grain passing through the bottom.

8. A device of the class described comprising a movable vehicle having a power-driven blower mounted thereon, the inlet to which is provided with a nozzle movable adjacent the ground as the vehicle is moved so as to pass over mowed and windrowed grain to cause the grain to be drawn into the blower with the incoming air, means providing a generally cylindrical chamber into which the outlet from the blower discharges in a generally tangential manner adjacent the bottom thereof, there being a generally tangential outlet from the chamber adjacent the top thereof, the cylindrical walls of the chamber presenting roughened surfaces, and the bottom of the chamber having passages therethrough for the passage of threshed grain, means for collecting the threshed grain passing through the bottom, said bottom being vertically adjustable, and means for adjusting the bottom in relation to the inlet to the chamber from the blower.

9. A device of the class described comprising a movable vehicle having a power-driven blower mounted thereon, the inlet to which is provided with a nozzle movable adjacent the ground as the vehicle is moved so as to pass over mowed and windrowed grain to cause the grain to be drawn into the blower with the incoming air, means providing a generally cylindrical chamber into which the outlet from the blower discharges in a generally tangential manner adjacent the bottom thereof, there being a generally tangential outlet from the chamber adjacent the top thereof, the cylindrical walls of the chamber presenting roughened surfaces, and the bottom of the chamber having passages therethrough for the passage of threshed grain, and means for collecting the threshed grain passing through the bottom, the inlet from the blower having adjustable baffles for directing air and grain from the blower against the roughened walls of the threshing chamber.

10. An apparatus for threshing grains comprising means providing a generally cylindrical chamber having a generally tangential inlet adjacent its bottom for the ingress of an air blast and grain to be threshed, there being an outlet adjacent the top of the chamber remote from the center of the top of the chamber providing for egress of air and chaff, and means providing an inwardly projecting imperforate ledge projecting inwardly from the cylindrical walls of the chamber below the inlet for causing air and grain entering the chamber to swirl upwardly helically in the chamber toward the outlet, the cylindrical walls being roughened to cause the grain to be threshed as it swirls upwardly in contact therewith.

11. An apparatus for threshing grains comprising means providing a generally cylindrical chamber having a generally tangential inlet adjacent its bottom for the ingress of an air blast and grain to be threshed, there being an outlet adjacent the top of the chamber remote from the center of the top of the chamber providing for egress of air and chaff, and means providing an inwardly projecting imperforate ledge projecting inwardly from the cylindrical walls of the chamber below the inlet for causing air and grain entering the chamber to swirl upwardly helically in the chamber toward the outlet, the cylindrical walls being roughened to cause the grain to be threshed as it swirls upwardly in contact therewith, the top of the chamber having a central opening therein surrounded by a downwardly extending apron.

References Cited in the file of this patent
UNITED STATES PATENTS

| | | |
|---|---|---|
| 2,471,326 | Hoyt | May 24, 1949 |
| 2,638,181 | Gordon | May 12, 1953 |
| 2,698,039 | Pritchett | Dec. 28, 1954 |
| 2,880,734 | Edstrom | Apr. 7, 1959 |
| 2,905,182 | Wise | Sept. 22, 1959 |